(No Model.)

M. THOMSON.
SALT CELLAR.

No. 374,508. Patented Dec. 6, 1887.

WITNESSES:
Fred G. Dieterich
P. B. Turpin

INVENTOR:
Metellus Thomson
BY Munn & Co
ATTORNEYS.

UNITED STATES PATENT OFFICE.

METELLUS THOMSON, OF KENTON, OHIO.

SALT-CELLAR.

SPECIFICATION forming part of Letters Patent No. 374,503, dated December 6, 1887.

Application filed March 25, 1887. Serial No. 232,388. (No model.)

*To all whom it may concern:*

Be it known that I, METELLUS THOMSON, of Kenton, in the county of Hardin and State of Ohio, have invented a new and useful Improvement in Salt-Cellars, of which the following is a specification.

My invention is an improvement in receptacles especially intended for use as salt-cellars, but which manifestly may be used for pepper and other like articles which it may be desired to distribute in finely-divided portions. Therefore, while the following description and the appended claim may refer to the improvement as pertaining to salt-cellars, it will be understood that I do not desire to be confined to such use.

The invention consists in a salt-cellar top provided with a slot or slots and having a disk or disks operating through said slot, and provided with sockets which receive the salt when within the cellar and discharge the same when the disk is turned to bring the sockets out of the top.

Figure 1:
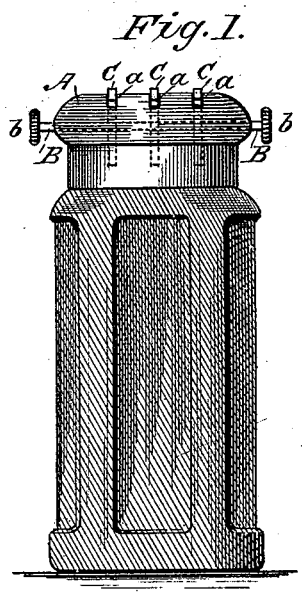
Figure 2:
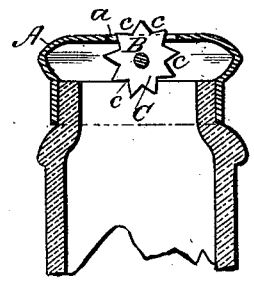

In the drawings, Figure 1 is a side elevation of a salt-cellar provided with my improvements, and Fig. 2 is a partial section thereof drawn through one of the slots of the top.

In the use of the ordinary pepper-box saltcellars the perforations frequently become clogged up, and by being sometimes clogged and at other times open, at times the salt is discharged quite freely, while at others little or no salt can be obtained. This leads to difficulties in properly seasoning the food at the table, which, while they may appear slight, are, in fact, troublesome and annoying. To avoid this difficulty various devices have been provided for keeping the salt in the cellar finely pulverized, as well as for opening the perforations in the top. By my invention, however, I seek to provide a device which may be easily operated, and the use of which will involve a positive outfeeding of the salt in an even regular quantity, so that the user may employ any quantity of salt desired.

The top A is provided in its upper side with one or more slots, $a$, usually, and preferably three, as shown. To the top is journaled the shaft B, which extends at right angles to the direction of length of the slots $a$, and is provided with heads $b$ or similar expedients, by which it may be easily turned. The disk or disks C are secured to this shaft B and turn through the slot or slots $a$, the number of disks and slots corresponding, as shown. Sockets $c$ are formed in the disks, and such sockets in the turning of the disks are brought into the cellar, where they receive salt when the cellar is inverted, and then out through slots $a$ when they discharge the salt, and by means of this construction the salt may be discharged positively to any desired quantity by the proper turning of the shaft.

The improvement is simple and in practice efficiently serves its end, its operation being easy and its action certain, as will be readily understood from the foregoing description and the accompanying drawings.

Having thus described my invention, what I claim, and desire to secure by Letters Patent, is—

As an improved article of manufacture, the herein-described salt-cellar top provided with a slot, the journaled shaft, and a disk fixed thereto and provided with sockets, the said disk being arranged to operate through the slot of the top, as and for the purposes specified.

METELLUS THOMSON.

Witnesses:
CHARLES SCHRADER,
KARL POERTNER.